Figure 4:
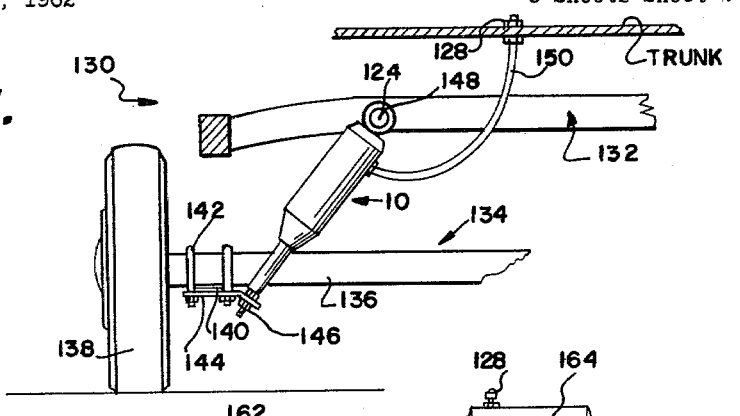

March 16, 1965  R. J. BROADWELL  3,173,671
LOAD-SUPPORTING DAMPER UNIT
Filed April 25, 1962  3 Sheets-Sheet 1
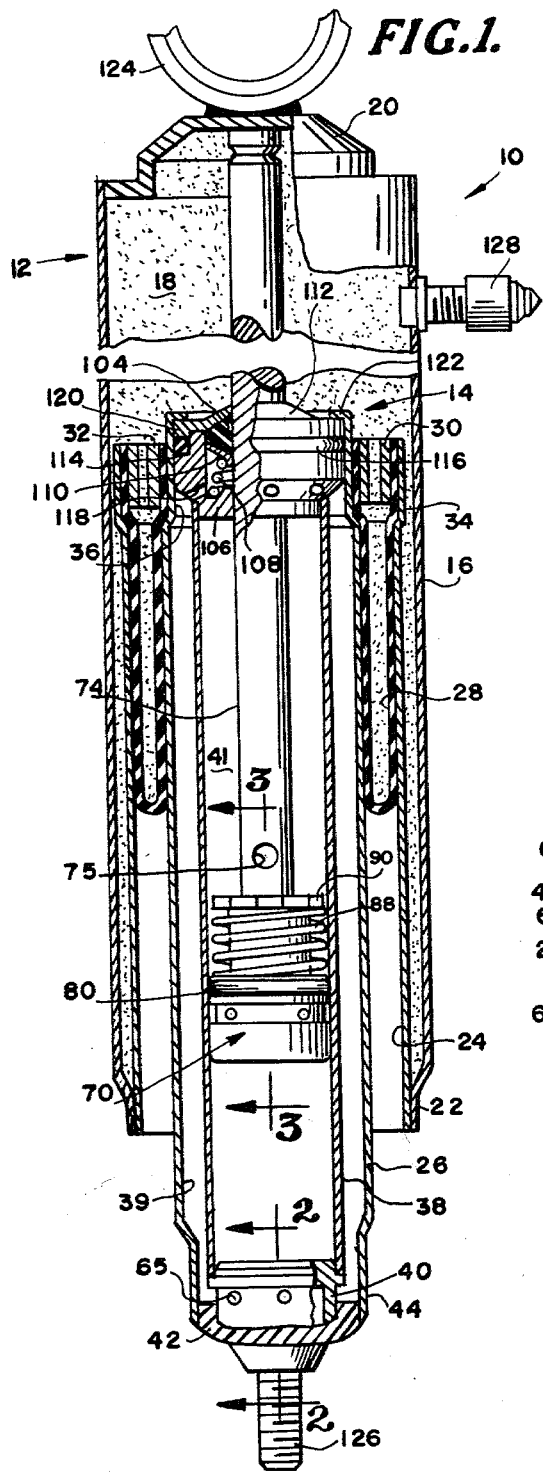
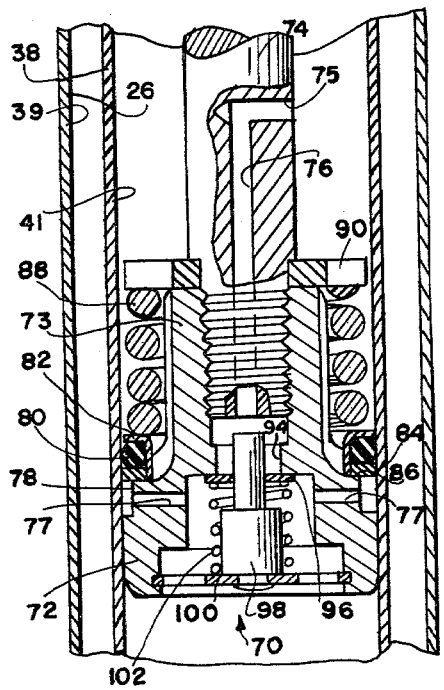
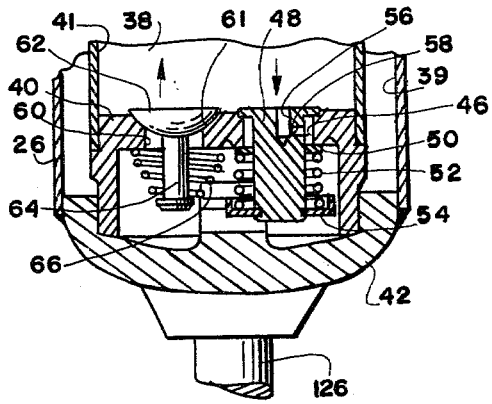
INVENTOR.
ROBERT J. BROADWELL
BY
Cushman, Darby & Cushman
ATTORNEYS March 16, 1965 R. J. BROADWELL 3,173,671
LOAD-SUPPORTING DAMPER UNIT
Filed April 25, 1962 3 Sheets-Sheet 2

INVENTOR.
ROBERT J. BROADWELL
BY
Cushman, Darby & Cushman
ATTORNEYS

United States Patent Office 3,173,671
Patented Mar. 16, 1965

3,173,671
LOAD-SUPPORTING DAMPER UNIT
Robert J. Broadwell, Cleveland, Ohio, assignor, by mesne assignments, to Maremont Corporation, Chicago, Ill., a corporation of Illinois
Filed Apr. 25, 1962, Ser. No. 190,106
4 Claims. (Cl. 267—64)

This invention relates to vehicle suspensions and more particularly to load supporting damper units of the type disclosed in my copending applications Serial No. 850,-957, filed November 4, 1959, now Patent No. 3,083,026 and Serial No. 859,613, filed December 15, 1959, now Patent No. 3,140,098. This application constitutes a continuation-in-part of both of the above mentioned copending applications.

In my copending application Serial Number 850,957, there is disclosed a load supporting damper assist unit which may be conveniently mounted between the sprung and un-sprung masses of a vehicle to provide a load supporting assist to the normal springs between such masses and also to provide the necessary damping action or energy absorption during the relative movement between the masses. The load supporting portion of the unit includes both a variable volume air chamber and a variable volume hydraulic chamber; the chambers being separated by a resilient sleeve-like diaphragm.

Also disclosed in my copending application Serial No. 850,957 is a complete suspension system wherein a plurality of the units previously described may be utilized in lieu of the conventional springs of the vehicle. Under such circumstances, the damper portion of each unit is utilized as a pump to supply high pressure hydraulic fluid to a reservoir or accumulator in response to the relative movements between the sprung and un-sprung masses of the vehicle during operation. The high pressure hydraulic fluid in the reservoir is utilized in turn to maintain the sprung mass of the vehicle at a desired predetermined level or height with respect to the unsprung mass by means of a suitable levelling valve. This self-levelling function of the system is achieved by introducing and exhausting hydraulic fluid into and out of the hydraulic chambers of the individual load-supporting damper units.

In my later filed copending application Serial No. 859,613, there is disclosed a system embodying two load-supporting damping units of the type previously described in which the height of the sprung mass of the vehicle is controlled by introducing and exhausting air under pressure into and out of the air chamber of each unit rather than hydraulic fluid into and out of the hydraulic chamber thereof.

The construction of the load supporting damping units disclosed in the above applications are highly advantageous in that they are more versatile and can be used in both variable air and variable hydraulic fluid systems. Where such units are utilized solely in a variable air system it is possible to eliminate the resilient sleeve-like diaphragm which separates the variable air chamber from the variable hydraulic fluid chamber; and, in effect, eliminate the variable hydraulic fluid chamber from the unit.

An object of the present invention is to provide a load supporting damper unit having a variable volume load supporting air chamber therein which is of simplified construction and which may be readily utilized in a levelling-type suspension system or as an individual assist unit.

Another object of the present invention is the provision of an improved pneumatic system for actuating a plurality of load-suport damper units to maintain the sprung mass of a vehicle at a substantially predetermined height with respect to the unsprung mass thereof.

These and other objects of the present invention will become more apparent during the course of the following detailed description and appended claims.

The invention may best be understood with respect to the accompanying drawings wherein illustrative embodiments are shown.

Figure 5:
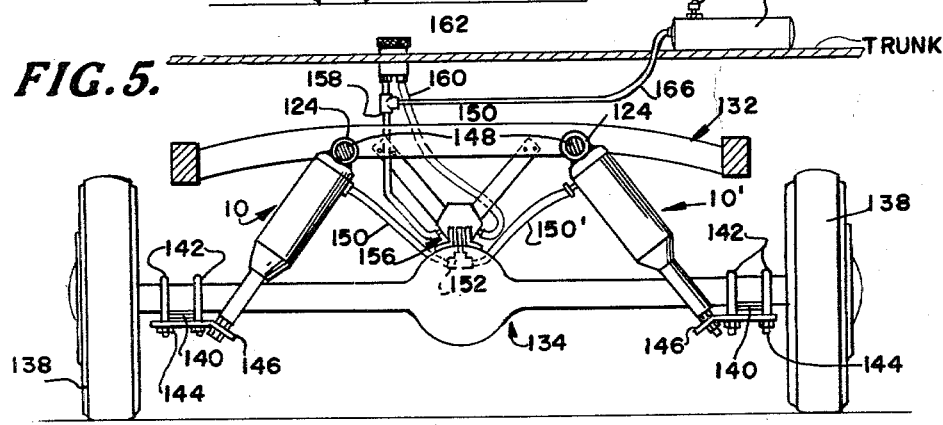
Figure 6:
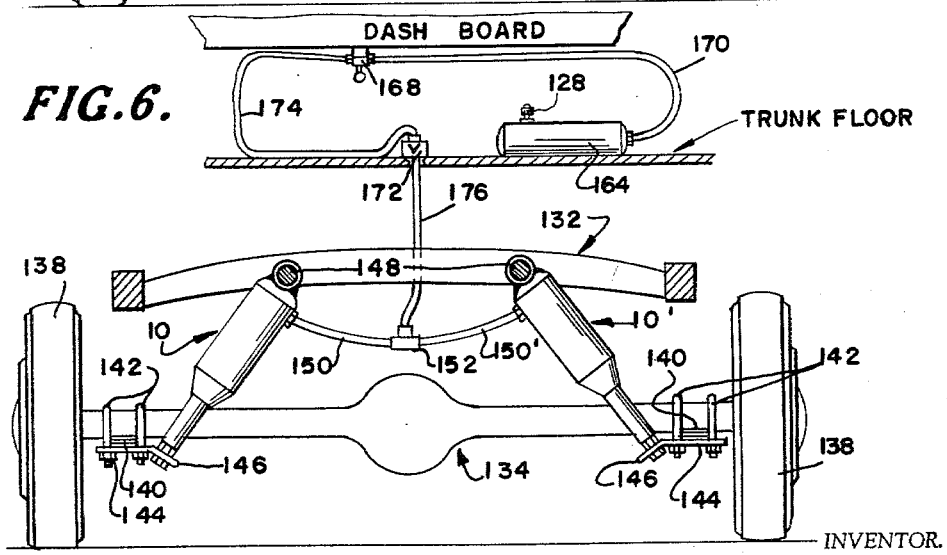
Figure 7:
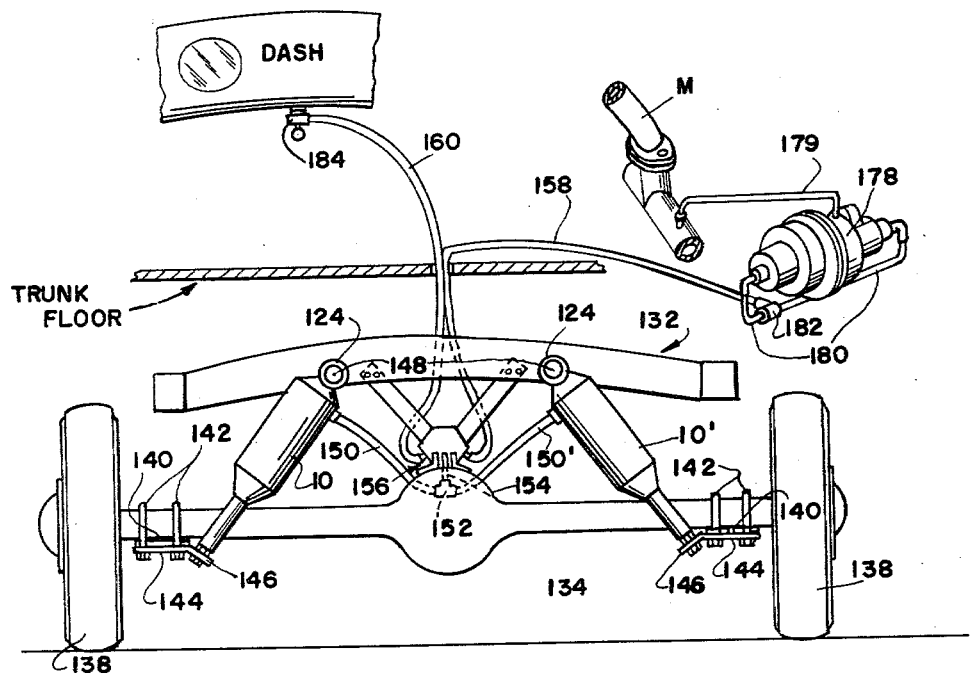

In the drawings:
FIGURE 1 is an elevation view, generally in section, of a combination air spring-shock absorber assembly according to the present invention;
FIGURES 2 and 3 are views taken along lines 2—2 and 3—3, respectively, in FIGURE 1;
FIGURE 4 is a diagrammatic view showing the assembly in FIGURE 1 mounted to the rear axle of a vehicle;
FIGURE 5 is an elevation view of a modified pneumatic circuit; and
FIGURE 6 is a diagramatic elevation view of still another pneumatic circuit.
FIGURE 7 is a diagrammatic elevation view of a further pneumatic circuit accoring to this invention, operative to supply air pressure generated from the vehicle engine.

Referring now to FIGURE 1, there is shown a load supporting damper unit 10 which includes an air spring assembly 12 and a damper assembly 14 mounted therein. The air spring assembly 12 includes an outer tubular casing member or housing 16 defining an air chamber 18 which constitutes the air spring of the unit. The upper end of the outer casing 16 is joined, as by welding or the like, to an end closure member 20. The opposite open end of the outer casing member 16 has a peripheral tapered portion 22; and, welded to the tapered portion 22 is a cylindrical inner tubular casing member 24. Mounted for longitudinal or telescoping movement relative to the inner tubular member 24 is a tubular casing member or plunger 26 forming a part of the damper assembly 14.

Connected between the adjacent ends of the tubular plunger member 26 and the inner tubular member 24 is a folded, rolling sleeve-type seal 28 which seal is preferably made of flexible material such as corded rubber or the like; however, other flexible materials may be utilized, as is apparent. The essential characteristics of the sleeve type seal 28 are that it is impervious to air, capable of being folded or rolled, and relatively non-resilient, so that it will not expand to any considerable extent under pressure.

The outer end of the sleeve 28 is rigidly secured to the inner tubular member 24 by a metal clamping ring 30. The opposite end of the folded sleeve 28 is fixedly secured to the inner end of the tubular plunger member 26 as by a metal clamping ring 32. In this regard, the respective ends of the inner tubular member 24 and the plunger member 26 are oppositely bent as at 34 and 36, respectively, to provide an enlarged recess for engagement of the rings 30 and 32 with the respective ends of the sleeve 28. The sleeve is folded between its secured ends, as mentioned, one ply of the fold engaging the interior surface of the inner tubular casing member 24 and the other ply of the fold engaging the exterior surface of the tubular plunger member 26.

The damper assembly 14 of the unit 10 also includes a cylinder member 38 mounted in spaced concentric relation to the plunger member 26 so as to define therewith an annular replenishing chamber 39. One end of the cylinder member 38 is fixedly secured to an end plate 40 which defines one end of a damper chamber 41 within the cylinder member. The end plate 40, in turn, is secured at its outer end to a cover plate 42, which is of generally cup-shaped configuration and abuts the end of the end plate 40 about its inner peripheral wall. The outer peripheral wall of the cover plate 42 is joined to the adjacent end 44 of the plunger member 26, completing the connection.

The end plate 40 is provided with an aperture 46 having a recess therein for receiving a flanged stem member 48 which extends through the aperture in spaced apart relationship and has slidably mounted thereon an apertured disc valve 50. A coil spring 52 serves to resiliently urge the disc valve 50 into engagement with the annular surface surrounding the inner end of the aperture 46, having its upper end in engagement with the disc valve 50 while its lower end is in engagement with a flange member 54 fixed to the lower end of the stem member 48. The stem member 48 has a longitudinal bore 56 formed in the upper end thereof communicating with a transverse compression passage 58 which extends radially to the outer periphery of the stem member 48 at a position above the disc valve 50.

The end plate 40 also has an aperture 60 formed therein which terminates in an upwardly facing frustro-conical valve seat 61. A replenishing valve having a head 62 is disposed adjacent the valve seat 61 and a stem 64 extending downwardly therefrom through the aperture 60. A conical coil spring 66 resiliently urges the replenishing valve 62 into engagement with the valve seat, its upper base end being in engagement with the end plate 40 and its lower end being in engagement with a flange formed on the lower extremity of the stem 64. Suitable passages 65 are formed in the end plate 40 to provide communication with the replenishing chamber 39.

Mounted within the cylinder member 38, is a valved piston, generally indicated at 70, which includes a piston body 72 having a lower hollow portion formed with a peripheral surface for engaging the interior of the cylinder member 38, and a reduced upper portion 73. The upper portion 73 of the piston 72 is interiorly threaded to receive the lower end of a piston rod 74, the upper end of the rod 74 being fixed to the central interior of the closure member 20. The piston rod 74 has a transverse passage 75 communicating with a longitudinal passage 76 extending to the lower end thereof.

Extending radially through the lower portion of the piston body 72 is a plurality of circumferentially spaced compression passages 77. The outer periphery of the lower portion of the piston body 72 adjacent the passages 77 is relieved, as indicated at 78, to permit the fluid flowing through the passages 77 to move axially upwardly therefrom. This movement of the fluid is controlled by an O-ring 80 of a diameter sufficient to engage the inner periphery of the cylinder member 38. The O-ring 80 is mounted between an upper carrier ring 82 of angular cross-sectional configuration and a lower sealing ring 84 arranged to engage an upwardly facing annular seating surface 86 formed on the piston body between the lower portion and the reduced upper portion thereof. The lower sealing ring 84 is resiliently urged into engagement with the seating surface 86 by means of a coil spring 88 surrounding the reduced upper portion 73 of the piston body 72. The lower end of the spring 88 engages the carrier ring 82 and the upper end thereof engages a notched washer 90 mounted between the lower end of the piston rod 74 and the upper extremity of the upper portion 73 of the piston body 72.

The lower end 94 of the axial passage in the rod 74 is arranged to be closed by means of disk valve 96. The disk valve is centrally apertured to receive a guide member 98 which is fixed to the lower end portion of the valve body 72, as by an apertured disk 100. The disk valve 96 is resiliently urged into engagement with the annular surface adjacent the opening 94 by means of a coil spring 102 mounted between the disk valve 96 and the apertured disk 100.

A resilient packing ring 104 is slidably carried in sealing engagement with the piston rod 74. A cup-shaped annular plug 106 is positioned between the rod 74 and the interior peripheral end of the plunger member 26, this plug also engaging the exterior peripheral surface of the resilient packing ring 104. A tapered compression spring 108 is nested within the plug 106, and an oppositely tapered compression washer 110 is positioned at the apex of the spring 108. The flexible packing ring 104 is seated with its lower tapered surface against the compression washer 110, and the plug 106 is closed by a cap 112 which engages the opposite upper tapered surface of the flexible packing ring 104. The plug 106 is peripherally recessed along its free end, as at 114, and receive an O-ring 116. Likewise, the plug 106 has transverse passages 118 communicating with the lower end of the cup-shaped recess, and the replenishing chamber 39. The cap 112 has a peripheral shoulder 120 for fixing the O-ring, as is apparent. The cap 112 is maintained in fixed engagement with the plug 106 by an inwardly turned flange 122 carried by the end of the plunger member 26.

Welded to the closure member 20 of the outer casing 16 (which constitutes the upper end of the unit 10) is an eye-connector 124, while a stem connector 126 is rigidly secured to the opposite, lower end plate 42.

As will be apparent, the load supporting damper unit 10 is adapted to replace the conventional shock absorbers of vehicles, the damper assembly 14 acting as an energy absorber, while the air spring assembly 12 is adapted to resiliently support a portion of the sprung mass of the vehicle on the unsprung mass thereof. The upper housing 16 carries a conventional tire valve 128 in communication with the air chamber 18 of the unit 10 to enable the air pressure within the air chamber to be varied.

Assembly of the elements is simplified by virtue of the fact the folded sleeve first is joined to the inner casing member 24 and plunger member 26, and this assembly is inserted as a unit into the outer casing member 16. The tapered end of the outer casing member 16 is then conveniently joined to the inner casing member 24, as by welding, to provide an air-tight joint.

Referring now to FIGURE 4, an exemplary mounting arrangement for the unit 10 is shown in assembled relationship with a vehicle 130. The vehicle 130 has a sprung mass 132, which includes the transverse underframe of the vehicle. The vehicle 130 conventionally has an unsprung mass 134 which includes a rear axle 136 and associated tires 138. The rear springs 140 and the vehicle 130 are conventionally joined to the axle 136 by U-bolts 142. Joined to the underside of the U-bolt 142 is a bracket plate 144 having a downwardly inclined lip 146. The transverse underframe of the vehicle 130 carries longitudinally extending studs 148 adapted to receive the eye-connector 124 of the unit 10. Also, the stem connector 126 of the unit 10 is joined to the lip 146 of the bracket plate 144 in inclined relationship, this being a well-known arrangement for mounting conventional shock absorbers to vehicles.

In the assembly shown in FIGURE 4, a flexible air hose 150 is connected at its one end to the casing 16 of the unit 10, while the opposite end is in operative communication with a conveniently accessible air filling station, for example, the floor of an automobile trunk. The tire valve 128, in this instance, is joined to the air hose 150 and is fixed to the trunk floor. Numerous alternative mounting positions for the tire valve 128 will be apparent to those skilled in the art; the arrangement shown in FIGURE 4 is, however, convenient for garage replacement purposes with used automobiles, as by a mechanic.

In operation, it will be understood that the air pressure within the air chamber 18 will determine the level or height of the frame 132 with respect to the axle assembly 136 under static conditions. Where severe static loads are placed on the frame 132, such as several pieces of luggage in the trunk, a trailer hitched to the rear bumper or the like, there may be a tendency for the frame 132 to ride too low to the axle assembly resulting in the rear overhang of the vehicle scraping the pavement in driveways or the like, a ride in which the frame bottoms out too often, and/or a situation in which the light beams of the vehicle are directed too far upwardly. With the present units mounted between the frame and axle assembly it is necessary merely to attach a conventional air hose, such as found in any filling station, to the valves 128 to introduced air into the air chambers 18 sufficient to raise the frame 132 to a level which appears to be satisfactory upon visual inspection. Of course, when the excessive static loads are removed, the frame 132 can be lowered to a more desirable level by simply actuating the tire valves to allow an appropriate amount of air to escape from the air chamber 18 of each unit.

Under dynamic conditions when the vehicle is in motion, it will be understood that the air spring assembly 12 of each unit serves to add resilient support to the frame 132 in addition to the support provided by the springs 140. The cylindrical casing member 26 acts as a plunger within the air chamber which extends and contracts the air chamber in response to extension and contraction of the entire unit as a result of the relative movements between the frame and the axle assembly.

Moreover, the damper assembly 14 of each unit absorbs the excessive energy resulting from the relative movements of the frame and axle assembly and serves to dampen these relative movements by controlled restriction of the hydraulic fluid within the damping chamber 41. In compression, the flow of fluid within each damping chamber is past the disk valve 84 from the lower portion of the chamber to the upper portion thereof. The excess hydraulic fluid, which is equal to the piston rod displacement, passes from the bottom portion of the damping chamber into the replenishing chamber 39 past the valve 50. On rebound, hydraulic fluid from the upper portion of each damping chamber flows through the passage 75 past the valve 96 and into the lower portion of the damping chamber and sufficient hydraulic fluid to replace the piston rod displacement is drawn into the lower portion of the damping chamber from the replenishing chamber past the replenishing valve 62.

It will be understood that the unit 10 of the present invention may be readily utilized in a self-leveling system of the type disclosed in my copending application Serial No. 859,613. Such a system is shown schematically in FIGURE 5 wherein the air hose 150 for the unit 10, constituting the left-hand unit of the system, is connected to a T-fitting 152. The T-fitting also receives an air hose 150' from an identical right-hand unit 10'. An air hose 154 is also connected to the T-fitting and to a lockout position sensitive three-way leveling valve mechanism 156 of a construction similar to the comparable valve mechanism disclosed in my co-pending application Serial No. 859,613 which is hereby incorporated by reference into the present disclosure.

The valve mechanism 156 also has connected therewith a high pressure line or air hose 158 and a low pressure or exhaust line or air hose 160, both of which are in turn connected to a filling and exhaust valve mechanism 162 which also is of a construction similar to the comparable valve mechanism disclosed in my co-pending application Serial No. 859,613. As disclosed in my above mentioned co-pending application, valve mechanism 162 includes a cap which acts as a valve to close the exhaust line 160 which ultimately has the effect of locking out the leveling valve mechanism 156. The valve mechanism 162 also includes a conventional tire valve which can be connected to a conventional filling station type air hose.

The arrangement can be appropriately modified by providing a pressure tank 164 in parallel with the high pressure line 158, as by a line or air hose 166. The provision of the tank 164 permits the system to elevate the frame 132 at any time rather than requiring an intermediate trip to the filling station. The tank 164 can then be refilled at the filling station at a more convenient time.

FIGURE 6 discloses another arrangement in which the amount of leveling of the system is determined by visual inspection rather than by an automatically operable position sensing valve mechanism. The system differs from that shown in FIGURE 4 in that it embodies an air pressure tank 164, such as that shown in FIGURE 5, which is connected, as by a line or air hose 170, with a conventional three-way valve 168 of any suitable construction conveniently mounted on the vehicle, as on the dash board or the like. The valve 168 includes an exhaust port in addition to the port connected with the tank 164 and a third port which is connected with the T-fitting 152 in series with a minimum pressure check valve 172, as by lines 174 and 176.

The check valve 172 merely serves to prevent the air pressure within the air chambers 18 of the units from going below a predetermined minimum value. The valve mechanism 168 is normally maintained in a null position in which all of the ports are closed off. When moved in one direction the air chambers 18 of the units are communicated with the atmosphere so as to permit the frame 132 to be lowered relative to the axle assembly 134. When the valve 168 is moved in the opposite direction the air chambers 18 of the units are communicated with the tank 164 so that the frame 132 can be raised relative to the axle assembly 134.

The present units may also be utilized in a self-leveling system which is operable not only under static conditions but under dynamic conditions as well, by the provisions of a continuous source of compressed air in lieu of the exahustable source 164 disclosed in the arrangement shown in FIGURE 5. Such a system is disclosed in FIGURE 7 and it will be noted that there is provided a pump assembly 178 which is preferably constructed in accordance with the teachings of Osburn Patent 2,630,102 issued March 3, 1953. As disclosed in the Osburn patent the inlet of the pump 178 is adapted to be connected to the suction manifold of the internal combustion engine of the vehicle, as by a line 179. The pump includes two parallel outlet lines 180 which are interconnected as by a T-fitting 182. The T-fitting 182 is, in turn, connected to the high pressure line 158 extending from the leveling valve mechanism 156 in lieu of the connection to the valve mechanism 162 previously described in connection with the arrangement shown in FIGURE 5. The exhaust line 160 of the leveling valve mechanism 156 extends to a simple, two-way valve 184 which is operable either to permit the line 160 to exhaust to atmosphere or to be closed off so as to lock out the leveling valve mechanism 156. It will be noted that with the system shown in FIGURE 7, automatic self-leveling of the frame 132 with respect to the axle assembly 134 can be obtained either continuously or selectively. If it is desired to lock out the leveling valve mechanism so that it will not operate under dynamic conditions, the valve 84 is moved to close off the exhaust line 160 which has the ultimate effect of locking out the leveling valve mechanism. On the other hand, the valve 184 may be moved to an open position permitting the line 160 to exhaust to atmosphere in which case the leveling valve mehcanism will automatically function to properly maintain the level of the frame 132 so long as the engine of the vehicle is in operation to provide power for the pump 178 which supplies the source of air under pressure to effect raising movements of the frame. As indicated above, it is not necessary to lock out the leveling valve during actual operation of the vehicle since the pump 178 is capable of supplying a continuous source of air under pressure so long as the engine of the vehicle is operating, even though it is preferred to lock out the valve mechanism during the actual movement of the vehicle.

Insofar as the operation of the pump 178 is concerned, an adequate disclosure thereof can be obtained by referring to the above-mentioned Osburn patent. For present purposes suffice it to say that the pump acts essentially as a demand pump. That is, so long as there is a predetermined pressure maintained in the line 158, the pump will not operate. However, as soon as this pressure is reduced by the demand of the units 10 and 10', pump 178 will automatically begin to function to raise the pressure back to its desired level and such pressure will be continuously available as demanded so long as the engine is running.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

What is claimed is:

1. A load supporting damper unit adapted to be connected between the sprung and unsprung masses of a vehicle comprising: a rigid outer tubular member open at one end and closed at the other; a rigid open ended cylindrical member fixedly secured at one end to the open end of said outer tubular member and extending therein; a cylinder member defining a hydraulic damping chamber therein; a piston slidably engaged within said cylinder member; a piston rod extending from one side of said piston outwardly of said cylinder member and having its outer end secured to said outer tubular member; a tubular casing member disposed in surrounding relation to said cylinder member and movable therewith telescopically within said cylindrical member and said outer tubular member, said casing member defining with said cylinder member an annular hydraulic replenishing chamber; means interconnecting one of the ends of said cylinder and casing members for permitting controlled restricted flow of hydraulic fluid between said damping and replenishing chambers in response to the sliding movement of said piston within said cylinder member; means interconnecting the other ends of said cylinder and casing members for providing a fluid-tight seal between the portion of said piston rod extending outwardly from said cylinder and casing members and said damping and replenishing chambers; means carried by said piston for permitting controlled restricted flow of hydraulic fluid within said damping chamber on opposite sides of said piston in response to the sliding movement of said piston within said cylinder member; a sleeve of flexible, fluid impervious material mounted in folded relation between the exterior periphery of said casing member and the interior periphery of said cylindrical member, said sleeve having one end thereof secured to the inner end of said casing member and the other end thereof secured to the other end of said cylindrical member, the portion of the sleeve extending between the one end thereof and the fold therein being disposed in engagement with the exterior periphery of said casing member and the portion of the sleeve extending between the opposite end thereof and the fold therein being disposed in engagement with the interior periphery of said cylindrical member; the exterior peripheries of said cylindrical member, said sealing means, and the portion of said piston rod extending outwardly of said sealing means and the interior peripheries of said sleeve and said outer tubular member defining a load supporting air chamber variable in volume in response to the telescopic movements of said cylinder and casing members within said cylindrical and outer tubular members; and means for permitting air under pressure to be introduced into and exhausted from said air chamber.

2. A load supporting damper unit as defined in claim 1 wherein inner end of said cylindrical member includes an enlarged offset portion, and a rigid ring fixedly securing the opposite end of said sleeve between the same and the offset portion of said cylindrical member.

3. A load supporting damper unit as defined in claim 2 wherein the opposite end of said casing member includes a reduced offset portion, and a rigid ring fixedly securing the one end of said sleeve between the same and the offset portion of said casing member.

4. A load supporting damper unit as defined in claim 1 wherein said last mentioned means comprises a tire valve mounted in said outer tubular member in communication with said air chamber.

References Cited in the file of this patent
UNITED STATES PATENTS
3,000,400    Cislo _____ Sept. 19, 1961